United States Patent
Oza et al.

(10) Patent No.: US 12,004,089 B2
(45) Date of Patent: Jun. 4, 2024

(54) POWER SPECTRAL DENSITY LIMITS FOR REGIONS OF A COVERAGE AREA IN A SATELLITE COMMUNICATION SYSTEM

(71) Applicants: Rajeev Oza, Boyds, MD (US); Suresh Korada, Boyds, MD (US); Guy Montgomery, Germantown, MD (US)

(72) Inventors: Rajeev Oza, Boyds, MD (US); Suresh Korada, Boyds, MD (US); Guy Montgomery, Germantown, MD (US)

(73) Assignee: Hughes Network Systems, Germantown, MD (US)

( * ) Notice: Subject to any disclaimer, the term of this patent is extended or adjusted under 35 U.S.C. 154(b) by 141 days.

(21) Appl. No.: 17/450,210

(22) Filed: Oct. 7, 2021

(65) Prior Publication Data
US 2022/0303916 A1    Sep. 22, 2022

Related U.S. Application Data

(60) Provisional application No. 63/162,145, filed on Mar. 17, 2021.

(51) Int. Cl.
*H04W 52/34* (2009.01)
*H04B 7/185* (2006.01)
*H04W 4/029* (2018.01)
*H04W 52/28* (2009.01)

(52) U.S. Cl.
CPC ........ *H04W 52/346* (2013.01); *H04B 7/1851* (2013.01); *H04W 4/029* (2018.02); *H04W 52/283* (2013.01)

(58) Field of Classification Search
CPC ... H04W 84/06; H04W 52/283; H04W 4/029; H04W 52/346; H04B 7/1851; H04B 7/18513
See application file for complete search history.

(56) References Cited

U.S. PATENT DOCUMENTS

| | | | |
|---|---|---|---|
| 5,543,813 A * | 8/1996 | Araki | G01S 13/878 455/12.1 |
| 2002/0058478 A1 | 5/2002 | Chapelle et al. | |
| 2017/0055229 A1 * | 2/2017 | Klockar | H04W 52/12 |
| 2017/0111912 A1 * | 4/2017 | Keshet | H04W 56/00 |
| 2019/0007129 A1 * | 1/2019 | Vargas | H04B 7/1858 |
| 2020/0252881 A1 | 8/2020 | Noel et al. | |
| 2022/0052753 A1 * | 2/2022 | Speidel | H04W 4/02 |

FOREIGN PATENT DOCUMENTS

| | | |
|---|---|---|
| EP | 3398264 A4 | 8/2019 |
| WO | 2020144572 A1 | 7/2020 |

OTHER PUBLICATIONS

International Search Report for PCT Application No. PCT/US2022/071127.

* cited by examiner

*Primary Examiner* — Keith Ferguson
(74) *Attorney, Agent, or Firm* — Capitol City TechLaw; Jasbir Singh (57) ABSTRACT

A system and method for providing terminals with permitted power spectral density (PSD) limits for regions of a coverage area including: dividing a coverage area into regions, each region having a boundary; assigning a PSD limit to each region; receiving a location of a transmitting entity; determining a transmitting entity region from the regions based on the location; and transmitting with a respective PSD limit of the transmitting entity region.

20 Claims, 4 Drawing Sheets

POWER SPECTRAL DENSITY LIMITS FOR REGIONS OF A COVERAGE AREA IN A SATELLITE COMMUNICATION SYSTEM

RELATED APPLICATIONS

The present application claims benefit from earlier filed U.S. Provisional Application No. 63/162,145, filed Mar. 17, 2021, which is incorporated by reference in its entirety for all purposes.

FIELD

A system and method for providing transmission power spectral density (PSD) limits to terminals based on their location.

BACKGROUND

Known satellite communication systems provide for terminals to operate under or at a fixed PSD limit for a geographical region by manually selecting between one of two PSD possibilities at terminal installation.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a non-transient computer-readable storage medium having instructions embodied thereon for a method for providing a power spectral density (PSD) limit. The method includes assigning a PSD limit and a boundary to regions of a coverage area of a satellite; determining a terminal region from the regions based on a location of a terminal; setting a terminal PSD limit to the PSD limit associated with the terminal region; and transmitting a burst from the terminal, where a PSD of the burst is less than or equal to the terminal PSD limit. Other embodiments of this aspect include corresponding computer systems, apparatus, and computer programs recorded on one or more computer storage devices, each configured to perform the actions of the methods.

Implementations may include one or more of the following features. The method where the boundary is defined with polygons. The method where the boundary coincides with a country boundary. The method where multiple regions of the regions are disposed within a country boundary. The method where one of the regions includes a no-transmit region due to the assigned PSD limit of the no-transmit region. The method where a first region of the regions is enclosed by a second region of the regions, and the setting sets the terminal PSD limit of the terminal as the PSD limit associated with the first region. The method where the terminal is one or more of an aeronautical, maritime, land mobile, or other mobile terminal. The method where the determining includes performing a point-in-polygon test on the location. The method where the determining includes estimating the location based on metrics of a RF transmission from the terminal. The method where the determining includes receiving the location from the terminal. The method where the determining is performed by a gateway. The method where the determining is based on a characteristic of the terminal selected from one or more of a heading, a speed, a beam definition plan version, an antenna directivity, a radome, a skew angle, and a terminal identification. The method may include calculating a particular PSD for the terminal from the terminal PSD limit, where the calculating is based on feedback from an antenna, the feedback includes one or more of an antenna directivity, a radome and a skew angle, and where the setting sets the terminal PSD limit to the particular PSD. The method may include selecting a beam of the satellite for the terminal to use based on the terminal region. The method where a beam of the satellite spans multiple regions of the regions, and an availability of the beam for the terminal to use is based on the terminal region. Implementations of the described techniques may include hardware, a method or process, or computer software on a computer-accessible medium.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

The present disclosure is directed to a system to provide terminals with the allowable location specific PSD level which includes a satellite to provide radio frequency signals to terminals at varied power spectral density levels, a terminal to receive the radio frequency signals and to transmit periodic data updates, a gateway to receive and transmit the radio frequency signals and the periodic data updates between the satellite and the terminal, a network management system to determine the allowable PSD level based on the data update, and the data update includes terminal location information.

The presently disclosed system further includes a centralized beam selector (CBS) which can receive periodic data updates from terminals, determine the allowable PSD level and beam selection, and provide the allowable PSD level and beam selection to the terminal. Some embodiments of the present system can have terminals, and in those cases, the CBS can multiplex the responses prior to sending the responses back to the terminals.

Other embodiments of the present system can also include an external beam selector (EBS) to receive periodic data from the CBS, determine the allowable PSD level and beam selection, and then provide the allowable PSD level and beam selection to the CBS. Again, in systems with terminals, the EBS can multiplex the responses prior to sending the response back to the terminals.

In the disclosed system, the data update from a terminal can include heading, speed, beam definition plan version, antenna directivity, radome, skew angle, and terminal identification. These terminals can be aeronautical, maritime, land mobile, or other mobile terminals.

The present system includes a gateway connected to the satellite, the internet, a network access point, and the network management system.

The current disclosure also includes a non-transient computer-readable storage medium having instructions embodied thereon, the instructions being executable by one or more processors to perform a method for providing the allowable PSD limits to terminal in regions of a coverage area, the method including dividing a coverage area into regions, each region having a boundary; assigning a PSD limit to each region; receiving a location of a transmitting entity; determining a transmitting entity region from the regions based on the location; and transmitting with a respective PSD limit of the transmitting entity region.

In this method, the boundary is defined with polygons, and the transmitting entity can be an aeronautical, maritime, land mobile, or other mobile terminal.

According to some embodiments, the disclosed method can further include calculating a particular PSD for the transmitting entity from the respective PSD limit, with the calculating accounting for various factors including antenna directivity, radome and skew angle based on a feedback from an antenna.

While the majority of regions will permit transmission, the disclosed method accounts for regions including a no-transmit region due to its assigned PSD limit.

In some embodiments of the disclosed method the determining step can be performed by a gateway and the respective PSD limit is communicated from the gateway to the transmitting entity, and in other embodiments, the determining step can be performed by the transmitting entity.

The present disclosure is directed to a satellite communication system and method where terminals and gateways transmit radio frequency signals towards the satellites for relaying back by the satellites to their intended destination. Depending on the location of the transmitting entity, a limit on PSD for a transmitting entity may be dictated by a governing entity for that location. For example, in the US the governing entity is Federal Communication Commission (FCC), while the European Conference of Postal and Telecommunications Administrations (CEPT) is the governing entity in the European Union and so on.

The present teachings disclose using a location specific PSD limit map by location. A coverage area may include PSD boundary regions for a specific PSD limit. The boundary may be defined, for example, with polygons. Once the transmitting entity (gateway or terminal) knows its location, it can figure out which PSD polygon it lies in and use the corresponding PSD limit for that location.

For mobile terminals or terminals that have a steerable or repointable antenna system possibly along with radome covering, the present teachings can be used to calculate effective maximum power which accounts for skew angle, radome loss in a selected direction, and specific antenna radiation pattern characteristics in terms of the directional power curves of main lobe and side lobes.

In the prior art, terminals are configured to use a specific single value for PSD that the terminal shall not exceed. The PSD value was based on a predetermined limit on where the terminal was supposed to operate.

The present teachings allow the terminal to select different PSD values depending on its actual location. Some advantages of various embodiments of the present disclosure include terminals that can be configured to have location specific PSD limits, terminals that can incorporate effects of antenna directivity, radome, and skew angle, etc. based on feedback from antenna, terminals that can be configured to have no-transmit zones, use of polygon shaping which allows for non-standard shaping of spot beams to cater to country or region specific PSD limits, determination of which polygon a terminal is located can be made by the local terminal or by a central entity, and the Centralized Beam Selector (CBS) allows for a single point of interface with an external entity to provide input in beam selection for the terminals. The PSD limits may be imposed, in some situations, by formal jurisdictions such as political boundaries: country, state, county, city, and so forth. In other situations, the PSD limits may be influenced by other factors such as local topography, vector angle from the transmitting satellite, local vegetation or forest density, local building density, and the like.

The present teachings may be used by any multi-beam, satellite based or otherwise, communication system that has fixed terminals, and aeronautical, maritime, land mobile or other mobile terminals.

In the present disclosure, the following terms are provided with these meanings:

Mobile Terminals: aeronautical, maritime, land mobile or any other mobile terminal.

Gateway: Device that has a RF link to a satellite to transmit and receive data from terminals and which has terrestrial or other connectivity to link the terminals to the internet.

Network: Coverage area of beams of one or more satellites linked to one or more gateways that can provide service to terminals in the coverage area, that is managed by a Network Management System (NMS).

NAP: Network Access Point. Access point to the internet for the network. There can be one or more of these in the network.

CBS: Centralized Beam Selector.

EBS: External Beam Selector.

BDP: Beam Definition Plan. Service plan level configuration for a group of terminals that defines satellite beams that a group of terminals can get service from, boundaries of those beams, version, PSD region polygons etc.

Figure 1:
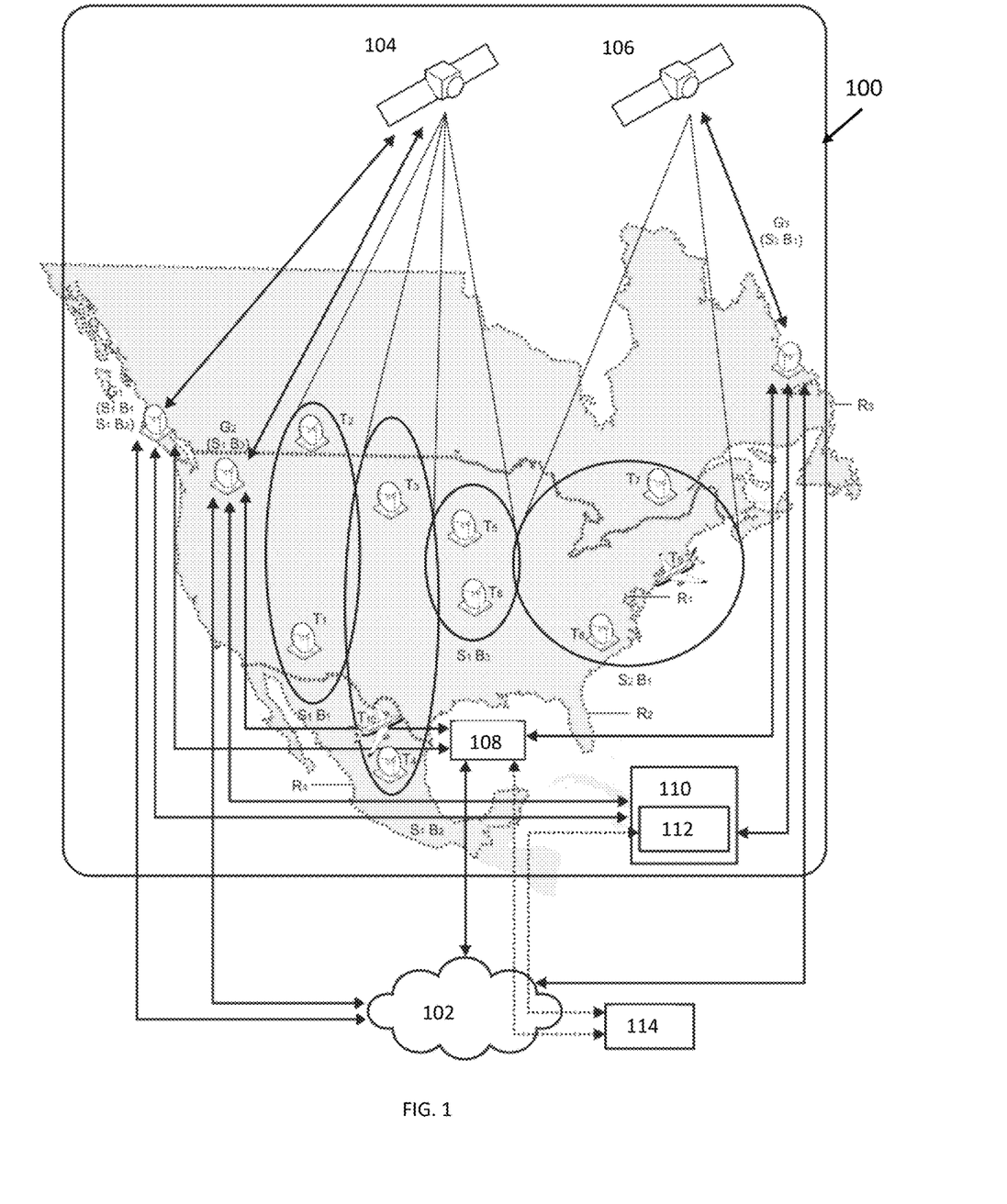
FIG. 1 illustrates an exemplary satellite system including multiple spot beams covering a service area according to various embodiments.

An exemplary satellite system 100 including multiple spot beams covering a service area according to various embodiments is illustrated in FIG. 1, here the network is managed by Network Management System 110 or $NMS_1$. This network has two satellites: $S_1$ and $S_2$, 104 and 106, respectively. The present teachings can be applied to one or multiple networks with differing numbers of satellites, beams and differing types of beams covering the service area.

In the example network of FIG. 1, $S_1$ satellite 104 has three beams: $S_1B_1$, $S_1B_2$—served by Gateway $G_1$, and $S_1B_3$ served by Gateway $G_2$. The $S_2$ satellite 106 has one beam: $S_2B_1$, served by Gateway $G_3$. The three gateways are connected to $NAP_1$, 108 and are also connected to the internet 102, and $NMS_1$, 110.

Terminals $T_9$ and $T_{10}$ are mobile aeronautical terminals and terminals $T_1$ to $T_8$ are fixed terminals. As a mobile terminal moves from one spot beam to another spot beam, it may have to associate with a different Gateway, which can be associated with the same NAP 108 in the network 100.

The system of FIG. 1 also shows an optional CBS 112. The terminals, $T_1$-$T_{10}$, can either run their own beam selection protocol locally or use the CBS to obtain a beam selection result. A fixed terminal may send a location update only during a commissioning/provisioning phase to the CBS 112 to find out which spot beam it should register in. This communication can be sent over a common access channel. Mobile terminals may send a location update periodically to the CBS 112 and the CBS 112 can provide a result of beam selection based on the location of the mobile terminal, the boundaries and the spot beams the mobile terminal is configured to use. As a mobile terminal approaches a boundary of its network, it can request a configuration for operation in one or more adjacent visitor networks, and subsequently can communicate with the CBS of the visitor network while in the coverage area of the visitor network.

A terminal location may be determined by a location service included in the terminal or the gateway. In some embodiments, the terminals $T_1$ to $T_{10}$ the location service may use a Global Navigation Satellite System (GNSS), such as, Global Positioning System (GPS) to determine a terminal's location and positioning. In some embodiments, the location service may be provisioned with a terminal location by a technician installing the terminal, a user of the terminal, a technician at a network operations center or the like. The location may be fine (for example, when provided by the GNSS) or an estimate, In the present teaching, PSD regions may be defined via polygon definitions. The polygon definitions in the FIG. 1 example follow country specific boundaries. PSD regions need not follow country specific boundaries. There are 4 different PSD regions defined in this example. $R_1$ region corresponds to a region around Washington DC. $R_2$ region corresponds to rest of the USA. $R_3$ region corresponds to Canada. $R_4$ region corresponds to Mexico. These regions are for illustration of this specific example and can be defined as needed.

A coordinate system can be utilized to define the polygons. Some possible options for the coordinate system are latitude/longitude pairs, earth-centered earth-fixed (ECEF) coordinate system, satellite centered angular coordinate system, and the like. Conversion of points from one coordinate system to another can be done to suit specific implementation needs.

Polygons can be defined as series of points defining edges of the polygon, where each point can be defined as (latitude, longitude) numbers, as (x,y,z) numbers in ECEF (Earth Centric Earth Fixed) coordinate system, as (az,el) numbers in Satellite centric angular system, or any other such coordinate system of choice. In some embodiments, a definition of the PSD region polygons can explicitly include a last node that is the same as the first node to define a closed region. In some embodiments, there may be an implicit assumption that each polygon is a closed polygon and there is a line connecting the first and last points of the polygon to define a closed region. The points can be either specified in order or can include an identifier specifying the order.

In FIG. 1, terminals $T_1$ and $T_2$ are in beam $S_1B_1$ and $T_1$ is in PSD region $R_3$ and $T_2$ is PSD region $R_2$. Similarly, terminals $T_3$ and $T_4$ are in beam $S_1B_2$, and $T_3$ is in PSD region $R_2$ and $T_4$ is PSD region $R_4$. In addition, there is a mobile terminal $T_{10}$ in beam $S_1B_2$, and is in PSD region $R_4$ and is about to enter PSD region $R_2$. Also, terminals $T_5$ and $T_6$ are in beam $S_1B_3$, and are both in PSD region $R_2$. Lastly, terminals $T_7$ and $T_8$ are in beam $S_2B_1$ with $T_7$ in PSD region $R_2$ and $T_8$ in PSD region $R_3$. In addition, there is a mobile terminal $T_9$ in beam $S_2B_1$ and in PSD region $R_2$, is about to enter PSD region $R_1$ and then re-enter $R_2$.

To determine which PSD region a terminal is in, a point-in-polygon test algorithm, including, for example, ray casting or winding number algorithms, can be used by the entity to determine the PSD region for that terminal. The algorithm can be run by the terminal, by the CBS 112 or by the EBS 114 as per the network configuration.

In FIG. 1, an optional External Beam Selector (EBS) 114 is also shown. The CBS 112 can provide an interface to the EBS 114 to provide input into the determination of which beam a terminal should use, or the ESB 114 can even provide the beam and PSD region for the terminal, and the CBS 112 can provide that information to the terminal. The input from a terminal can include, but not be limited to, location, heading, beam definition plan version, speed, etc. A Beam Definition Plan (BDP) version can encapsulate information about which beams a terminal is permitted to get service from, beam boundary definitions, PSD region polygons, etc. for the terminals and satellites in a network coverage area. PSD regions can be located entirely within a beam or can require multiple beams to be fully encompassed as shown in FIG. 1.

Figure 2:
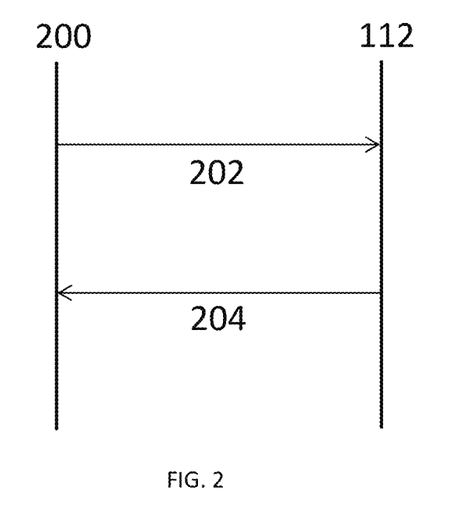
FIG. 2 illustrates a response mode between a terminal and a Centralized Beam Selector (CBS) according to various embodiments.

According to various embodiments of the present disclosure there are several modes of operations possible. FIG. 2 shows an individual terminal response mode using a CBS 112 which allows for a quick response from the CBS 112 back to the terminal 200. Here, a data update 202 including information on location, heading, speed, beam configuration version, etc. is transmitted to the CBS 112, and a beam selection result 204 including the proper beam to use and the PSD region with PSD level is transmitted back to the terminal 200. When a large number of individual terminals are sending messages simultaneously to the CBS, and the CBS is sending back the beam selection results simultaneously significant messaging bandwidth may be required.

Figure 3:
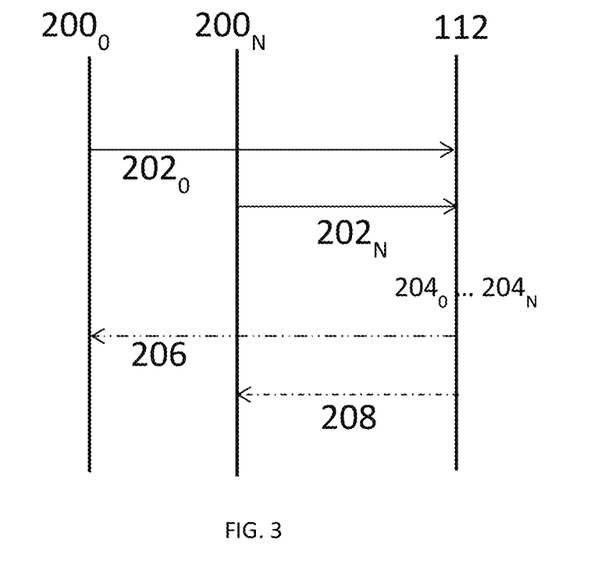
FIG. 3 illustrates a broadcast or multicast mode of response back to the terminals using CBS, according to various embodiments.

According to various embodiments of the present disclosure, FIG. 3 illustrates a broadcast or multicast mode of sending responses back to terminals $200_0$ to $200_N$ using a CBS 112. Here the CBS 112 can group a number of terminal responses together before periodically sending beam selection results $204_0$ to $204_N$ to terminals $200_0$ to $200_N$. The beam selection results $204_0$ to $204_N$ may be held and grouped by the CBS 112 for transmission via a broadcast or multicast message. For instance, the CBS could group the responses for terminals $200_0$ to $200_{(N-x)}$ (with x being a positive integer) in a multicast beam selection response 206, and then group the responses for terminals $200_{(N-x)+1}$ to $200_N$ into a subsequent multicast beam selection response 208 those terminals. In the Figures, the broadcast or multicast messages are indicated using dashed lines. This approach can conserve messaging bandwidth. The respective methods as exemplified in FIGS. 2 and 3 can be utilized independently for different groups of terminals in the network.

Figure 4:
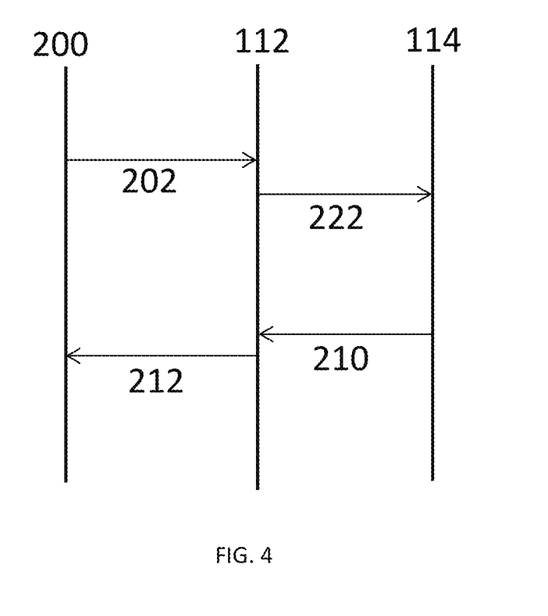
FIG. 4 illustrates an individual terminal response mode with both a CBS and an External Beam Selector (EBS), according to various embodiments.

FIG. 4 illustrates an individual terminal response mode with an EBS 114. According to various embodiments of the present disclosure, this mode allows for a quick response back to the terminal. The data update 202 from the terminal 200 including information on location, heading, speed, beam configuration version, etc. is transmitted to the CBS 112, then forwarded 222 to the EBS 114, which then transmits back a beam selection result 210 to the CBS 112, which transmits the beam selection result 212 back to the terminal 200. One disadvantage of this method is that when a large number of terminals are sending messages to the CBS 112, it can take significant messaging bandwidth to send messages between the CBS 112 and the EBS 114.

Figure 5:
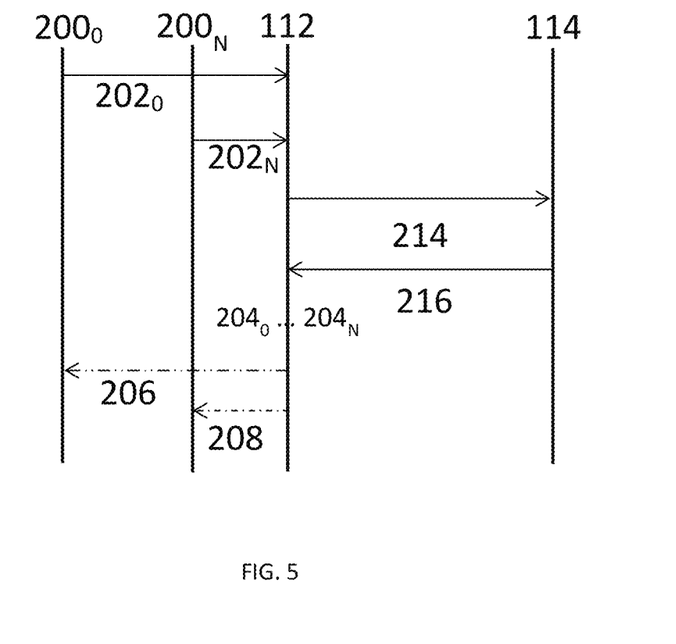
FIG. 5 illustrates a broadcast or multicast mode of response back to a group of terminals from a CBS and EBS, according to various embodiments.

FIG. 5 illustrates a broadcast/multicast mode of responding back to a group of terminals from an EBS 114 with an intermediate CBS 112 according to various embodiments of the present disclosure. In the illustrated mode, the CBS 112 can send a message 214 periodically to the EBS 114 by grouping a few data updates $202_0$ to $202_N$ together to conserve messaging bandwidth as compared to the previous method. The response from the EBS 114 can be sent by the CBS 112 via targeted, or multicast responses back to terminals $200_0$ to $200_N$. Specifically, the data updates $202_0$ to $202_N$ from terminals $200_0$ to $200_N$ including information on location, heading, speed, beam configuration version, etc. are transmitted to the CBS 112, and forwarded 214 to the EBS 114. The EBS 114 then transmits a beam selection result 216 back to the CBS 112. The CBS 112 may group the beam selection results $204_0$ to $204_N$ included in the beam selection result 216, and transmit multicast beam selection messages 206 and 208 back to the terminals $200_0$ to $200_N$ as described with respect to FIG. 3.

The methods illustrated in FIGS. 4 and 5 can be implemented independently for different groups of terminals in the network.

Figure 6:
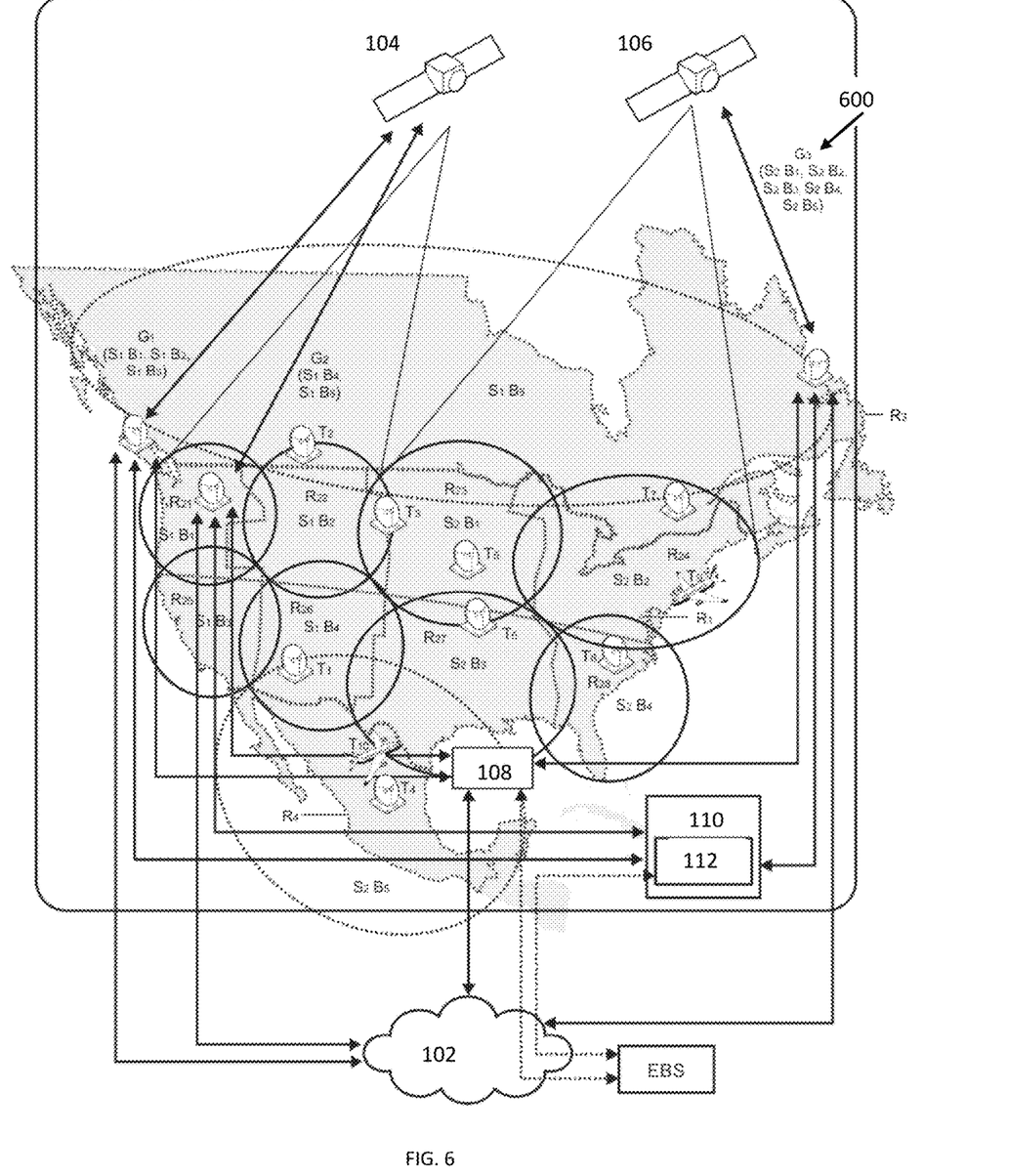
FIG. 6 illustrates an exemplary satellite system including multiple spot beams covering a service area according to various embodiments.

FIG. 6 illustrates an exemplary satellite system 600 including multiple spot beams covering a service area. According to various embodiments of the present disclosure, different groups of terminals can use different BDPs. One such possible variation is shown in FIG. 6 which has a different beam plan and different PSD region polygons as compared to FIG. 1.

In the system set forth in FIG. 6, the $R_2$ region from FIG. 1, has been divided into 8 separate regions, $R_{21} \ldots R_{28}$. Regions $R_3$ and $R_4$ correspond to Canada and Mexico, respectively. Each of these 10 regions is defined by a closed polygon. Additionally, satellites S1 104 and S2 106 are each transmitting five different beams, $S_1B_{1-5}$ and $S_2B_{1-5}$, respectively.

In FIG. 6, terminal $T_1$ is in beam $S_1B_4$ and $T_1$ is in PSD region $R_{26}$, while $T_2$ is in beam $S_1B_5$ and PSD region $R_3$. Terminals $T_3$ is in an overlapped area between beams $S_1B_2$ and $S_2B_1$ and straddles PSD regions $R_{22}$ and $R_{23}$. $T_4$ is in beam $S_2B_5$ and in PSD region $R_{24}$. Terminals $T_5$ is in beam $S_2B_1$, and in PSD region $R_{23}$. $T_6$ is in beam $S_2B_3$ and is in PSD region $R_{27}$. Terminal $T_7$ is in an overlapped area between beams $S_1B_5$ and $S_2B_2$ and is located in PSD region $R_3$. Lastly, terminal $T_8$ is in beam $S_2B_4$ in PSD region $R_{28}$.

Mobile terminal $T_9$ is moving from $R_{24}$ to $R_1$, back into $R_{24}$ and then into $R_{28}$. In addition, there is a mobile terminal $T_{10}$ in PSD region $R_4$ is about to enter PSD region $R_{27}$.

To determine which PSD region a terminal is in, a point-in-polygon test algorithm including, for example, ray casting or winding number algorithms, can be used by the entity to determine the PSD region for that terminal. The algorithm can be run by the terminal, by the CBS 112 or by the EBS 114 as per the network configuration.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

We claim as our invention:

1. A non-transient computer-readable storage medium having instructions embodied thereon, the instructions being executable by one or more processors to perform a method for providing a power spectral density (PSD) limit, the method comprising:
   assigning a PSD limit and a boundary to regions of a coverage area of a satellite;
   determining a terminal region from the regions based on a location of a terminal;
   setting a terminal PSD limit to the PSD limit associated with the terminal region;
   receiving a periodic location update at a centralized beam selector (CBS);
   determining the terminal PSD limit and a beam selection;
   providing the terminal PSD limit and the beam selection to the terminal; and
   transmitting a burst from the terminal, wherein a PSD of the burst is less than or equal to the terminal PSD limit.

2. The method of claim 1, wherein the boundary is defined with polygons.

3. The method of claim 1, wherein the boundary coincides with country boundaries and water bodies.

4. The method of claim 1, wherein multiple regions of the regions are disposed within country boundaries and water bodies.

5. The method of claim 1, wherein one of the regions comprises a no-transmit region due to the assigned PSD limit of the no-transmit region.

6. The method of claim 1, wherein a first region of the regions is enclosed by a second region of the regions, and the setting sets the terminal PSD limit of the terminal as the PSD limit associated with the first region.

7. The method of claim 1, wherein the terminal is one or more of an aeronautical, maritime, land mobile, or other mobile terminal.

8. The method of claim 1, wherein the determining comprises performing a point-in-polygon test on the location.

9. The method of claim 1, wherein the determining comprises estimating the location based on metrics of a RF transmission from the terminal.

10. The method of claim 1, wherein the determining comprises receiving the location from the terminal.

11. The method of claim 1, further comprising sending the terminal PSD limit to a terminal.

12. The method of claim 1, wherein the determining is performed by a gateway comprising a Centralized Beam Selector (CBS).

13. The method of claim 1, wherein the determining is performed by the terminal.

14. The method of claim 1, wherein the determining is based on a characteristic of the terminal selected from one or more of a heading, a speed, a beam definition plan version, an antenna directivity, a radome, a skew angle, and a terminal identification.

15. The method of claim 1, further comprising calculating a particular PSD for the terminal from the terminal PSD limit, wherein the calculating is based on a feedback from an antenna, wherein the feedback comprises one or more of an antenna directivity, a radome loss and a skew angle, and wherein the setting sets the terminal PSD limit to the particular PSD.

16. The method of claim 15, further comprising receiving the feedback at a performed by a gateway comprising a Centralized Beam Selector (CBS), wherein the determining determines the PSD limit based on the particular PSD.

17. The method of claim 1, further comprising selecting a beam of the satellite for the terminal to use based on the terminal region.

18. The method of claim 1, wherein a beam of the satellite spans multiple regions of the regions, and an availability of the beam for the terminal to use is based on the terminal region.

19. The method of claim 1, wherein the boundary coincides with country boundaries and water bodies.

20. The method of claim 1, wherein the determining comprises performing a point-in-polygon test on the location.

* * * * *